(12) United States Patent
Sano et al.

(10) Patent No.: US 10,952,195 B2
(45) Date of Patent: Mar. 16, 2021

(54) TRANSMITTER AND RECEIVER

(71) Applicant: NTT DOCOMO, INC., Tokyo (JP)

(72) Inventors: Yousuke Sano, Tokyo (JP); Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 23 days.

(21) Appl. No.: 16/099,596

(22) PCT Filed: May 9, 2017

(86) PCT No.: PCT/JP2017/017490
§ 371 (c)(1),
(2) Date: Nov. 7, 2018

(87) PCT Pub. No.: WO2017/195763
PCT Pub. Date: Nov. 16, 2017

(65) Prior Publication Data
US 2019/0132823 A1 May 2, 2019

(30) Foreign Application Priority Data
May 12, 2016 (JP) .............................. JP2016-096522

(51) Int. Cl.
*H04W 72/12* (2009.01)
*H04W 72/04* (2009.01)
(Continued)

(52) U.S. Cl.
CPC ........ *H04W 72/042* (2013.01); *H04B 7/0626* (2013.01); *H04L 5/0051* (2013.01);
(Continued)

(58) Field of Classification Search
CPC ..... H04L 5/0048; H04L 5/0044; H04L 5/001; H04L 5/0055; H04L 5/0051;
(Continued)

(56) References Cited

U.S. PATENT DOCUMENTS

2016/0112992 A1   4/2016 Bhushan et al.
2018/0323943 A1* 11/2018 Jiang ..................... H04L 5/0092
(Continued)

FOREIGN PATENT DOCUMENTS

EP           3457787 A1    3/2019

OTHER PUBLICATIONS

Qualcomm Incorporated; "Frame structure requirements"; 3GPP TSG-RAN WG1 #84bis R1-162206; Busan, Korea, Apr. 11-15, 2016 (10 pages).

(Continued)

*Primary Examiner* — Jae Y Lee
*Assistant Examiner* — Aixa A Guadalupe Cruz
(74) *Attorney, Agent, or Firm* — Osha Bergman Watanabe & Burton LLP

(57) ABSTRACT

Provided is a technique that transmits data, which is transmitted without obtaining transmission permission, with low delay and high reliability.
An aspect of the invention relates to a transmitter including a resource determination unit that determines whether a first type of resource has been allocated in response to the generation of a transmission event for a predetermined type of information and a transmitting unit that transmits the predetermined type of information to a receiver, using the first type of resource, without obtaining transmission permission, when the first type of resource has been allocated.

9 Claims, 7 Drawing Sheets

(51) Int. Cl.
  *H04W 74/02* (2009.01)
  *H04B 7/06* (2006.01)
  *H04L 5/00* (2006.01)
  *H04W 28/04* (2009.01)
  *H04W 72/02* (2009.01)

(52) U.S. Cl.
  CPC ............ *H04W 28/04* (2013.01); *H04W 72/02* (2013.01); *H04W 72/04* (2013.01); *H04W 72/12* (2013.01); *H04W 72/1242* (2013.01); *H04W 74/02* (2013.01); *H04L 5/0042* (2013.01); *H04L 5/0094* (2013.01)

(58) Field of Classification Search
  CPC ..... H04L 5/0035; H04L 5/005; H04L 5/0096; H04L 1/1893; H04L 27/2647; H04L 5/003; H04L 1/0018; H04L 1/0068; H04L 2012/5624; H04W 72/0446; H04W 4/005; H04W 72/0453; H04W 74/0833; H04W 16/14; H04W 88/08; H04B 1/713; H04B 7/0413; H04B 7/0697; H04B 7/0452; H04J 13/004; H04J 13/0088
  See application file for complete search history.

(56) References Cited

U.S. PATENT DOCUMENTS

| | | | | |
|---|---|---|---|---|
| 2019/0165906 A1* | 5/2019 | Bala | ...................... | H04L 5/0007 |
| 2020/0186313 A1* | 6/2020 | Wong | .................... | H04L 1/0025 |
| 2020/0187225 A1* | 6/2020 | Xia | ........................... | H04L 1/18 |

OTHER PUBLICATIONS

Intel Corporation; "Considerations on waveform selection for new radio interface"; 3GPP TSG RAN WG1 Meeting #84bis R1-162384; Busan, South Korea, Apr. 11-15, 2016 (6 pages).

Samsung; "Ultra-reliability with low-latency support in 5G new radio interface"; 3GPP TSG RAN WG1 Meeting #84bis R1-162189; Busan, Korea, Apr. 11-15, 2016 (5 pages).

NTT Docomo; "New SID Proposal: Study on New Radio Access Technology"; 3GPP TSG RAN Meeting #71 RP-160671; Göteborg, Sweden, Mar. 7-10, 2016 (8 pages).

3GPP TS 36.331 V12.9.0; "3rd Generation Partnership Project; Technical Specification Group Radio Access Network; Evolved Universal Terrestrial Radio Access (E-UTRA); Radio Resource Control (RRC); Protocol specification (Release 12)"; Mar. 2016 (456 pages).

3GPP TS 36.211 V12.8.0; "3rd Generation Partnership Project; Technical Specification Group Radio Access Network; Evolved Unviersal Terrestrial Radio Access (E-UTRA); Physical channels and modulation (Release 12)"; Dec. 2015 (136 pages).

3GPP TS 36.212 V12.8.0; "3rd Generation Partnership Project; Technical Specification Group Radio Access Network; Evolved Universal Terrestrial Radio Access (E-UTRA); Multiplexing and channel coding (Release 12)"; Mar. 2016 (95 pages).

3GPP TS 36.213 V12.9.0; "3rd Generation Partnership Project; Technical Specification Group Radio Access Network; Evolved Universal Terrestrial Radio Access (E-UTRA); Physical layer procedures (Release 12)"; Mar. 2016 (5 pages).

International Search Report issued for PCT/JP2017/017490, dated Jul. 4, 2017 (5 pages).

Written Opinion issued for PCT/JP2017/017490, dated Jul. 4, 2017 (10 pages).

3GPP TSG RAN WG1 meeting #84 bis; R1-162549; "Discussion on numerology and frame structure" Spreadtrum Communications; Apr. 11-15, 2016; Busan, Korea (6 pages).

3GPP RAN workshop on 5G; RWS-150012; "5G Views on Technology & Standardization" Qualcomm; Sep. 2015; Phoenix, USA (21 pages).

Extended European Search Report issued in European Application No. 17796124.0, dated Nov. 19, 2019 (14 pages).

\* cited by examiner

TRANSMITTER AND RECEIVER

TECHNICAL FIELD

The present invention relates to a wireless communication system.

BACKGROUND ART

In recent years, in the 3rd Generation Partnership Project (3GPP), a next-generation system that is called 5G succeeding Long Term Evolution (LTE)-Advanced, which is a fourth-generation wireless communication system, has been discussed. In 5G, three use cases, that is, extended Mobile Broadband (eMBB), massive Machine Type Communication (mMTC), and Ultra Reliability and Low Latency Communication (URLLC) are assumed (see Non-Patent Document 1).

URLLC requires low delay and high reliability. The introduction of a short transmission time interval (TTI) length (which may be referred to as a subframe length or a subframe interval) has been discussed in order to achieve low-delay transmission. For example, the number of symbols per subframe may be reduced or the interval between subcarriers may be increased to reduce a symbol length. In addition, a control delay from the generation of a packet to the transmission of data may be reduced. The introduction of a coding or modulation method with a low coding rate which achieves a low bit error rate has been discussed in order to achieve high reliability. Alternatively, there is an approach using diversity.

In URLLC, transmission data with a high degree of urgency is likely to be suddenly generated and it is necessary to transmit the data, which has been suddenly generated, with low delay and high reliability.

When data to be transmitted is generated in a user equipment, for example, in LTE uplink communication, the user equipment transmits a scheduling request (SR) to a base station to request the base station to allocate resources at the beginning. The base station notifies the user equipment of the allocation of resources as uplink transmission permission and the user equipment transmits data in the resource designated by the base station. However, in URLLC, as described above, the data to be transmitted is likely to be suddenly generated. When data is transmitted by the above-mentioned process, the requirement of low delay may not be satisfied. For this reason, in URLLC, it is assumed that the user equipment autonomously transmit data, without obtaining uplink transmission permission from the base station. In this case, URLLC data which is transmitted without obtaining uplink transmission permission is likely to collide with data transmitted from other user equipments since a transmission resource is not controlled by the base station.

In this contention-type URLLC, the user equipment can autonomously select a transmission resource. However, it is assumed that the resources which can be used for transmission are limited a little in order to reduce interference with other user equipments. As one approach, it is assumed that a contention-type resource which is allowed to transmit only a contention-type packet is defined and the user equipment transmits a URLLC packet using the contention-type resource, as illustrated in FIG. 1. The position of the contention-type resource may be semi-statically notified by, for example, a broadcast signal.

CITATION LIST

Non-Patent Document

Non-Patent Document 1: RP-160671

SUMMARY OF THE INVENTION

Problem to be Solved by the Invention

When a URLLC packet is transmitted by the contention-type resource, there is the possibility that other user equipments will transmit a contention-type packet (for example, a URLLC packet). Therefore, when contention occurs, it is likely that the requirement of the high reliability of the URLLC packet will not be satisfied due to interference.

As another approach, when an uplink transmission resource is allocated for a channel different from that for a URLLC packet during the generation of a URLLC packet, it is assumed that the URLLC packet is inserted into a portion of the channel and is then transmitted. As this channel, for example, eMBB that is used for a mobile broad band service is considered. It is considered that, when a URLLC packet is transmitted by a resource allocated to eMBB, there is no great interference with transmission from other user equipments in at least the same cell. The reason is as follows. In eMBB, it is assumed that the transmission resources between terminals and between channels are orthogonally multiplexed. Alternatively, it is considered that, even when a plurality of terminals or channels are non-orthogonally multiplexed in the same transmission resource, the amount of interference is controlled such that at least eMBB can be detected. Therefore, when an eMBB resource is allocated during the generation of URLLC data, it is preferable that the user equipment transmit a URLLC packet, using the eMMB resource rather than the contention-type resource, in order to satisfy the requirement of high reliability.

In order to solve the above-mentioned problems, an object of the invention is to provide a technique for transmitting data, which is transmitted without obtaining transmission permission, with low delay and high reliability.

Means for Solving Problem

In order to achieve the object, an aspect of the invention relates to a transmitter including a resource determination unit that determines whether a first type of resource has been allocated in response to generation of a transmission event for a predetermined type of information and a transmitting unit that transmits the predetermined type of information to a receiver, using the first type of resource, without obtaining transmission permission, when the first type of resource has been allocated.

Another aspect of the invention relates to a receiver including a resource allocation unit that allocates a first type of resource to a transmitter, a receiving unit that receives the first type of resource from the transmitter, and a detection unit that detects a predetermined type of information, which has been transmitted without obtaining transmission permission, from the first type of resource received from the transmitter.

Effect of the Invention

According to the invention, it is possible to transmit data, which is transmitted without obtaining transmission permission, with low delay and high reliability.

MODE(S) FOR CARRYING OUT THE INVENTION

Hereinafter, an embodiment of the invention will be described with reference to the drawings.

In the following embodiment, a transmitter and a receiver for transmitting and receiving data that requires low delay and high reliability, such as URLLC data, are disclosed. The following embodiment will be described in brief. When transmitting data without obtaining transmission permission, the transmitter transmits the data, using a resource that has been allocated from the receiver. Therefore, the transmitter transmits contention-type data that can be transmitted without obtaining transmission permission. As a result, the transmitter can reliably transmit data requiring low delay and high reliability, such as URLLC data, using the resource that has been allocated from the receiver and does not interfere with transmission from other transmitters, as compared to the method according to the related art which uses the contention-type resource shared by other transmitters.

Figure 2:
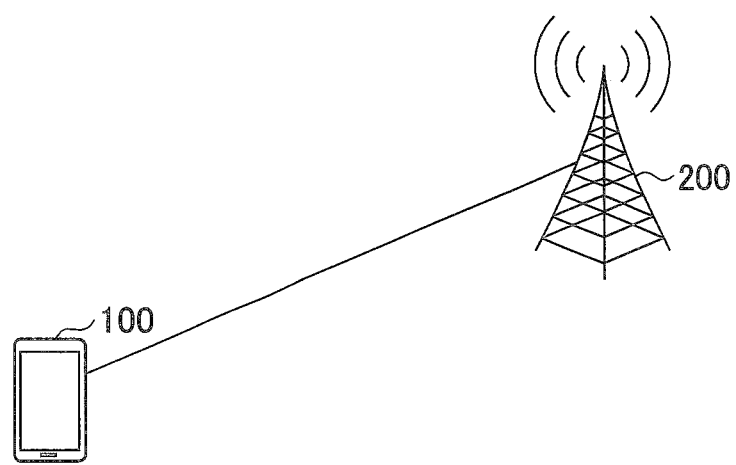
FIG. 2 is a diagram schematically illustrating a wireless communication system according to an embodiment of the invention.

First, a wireless communication system according to an embodiment of the invention will be described with reference to FIG. 2. FIG. 2 is a diagram schematically illustrating the wireless communication system according to the embodiment of the invention.

As illustrated in FIG. 2, a wireless communication system 10 includes a transmitter 100 and a receiver 200. In the following embodiment, it is assumed that the transmitter 100 is a user equipment (UE) and the receiver 200 is a base station (evolved NodeB: eNB), as illustrated in FIG. 2. However, the invention is not limited thereto. The transmitter 100 may be a base station or other wireless communication devices and the receiver 200 may be a user equipment or other wireless communication devices. In addition, both the transmitter 100 and the receiver 200 may be user equipments. In this case, data is wirelessly transmitted and received between the user equipments.

In the following embodiment, the transmitter 100 can transmit data that requires low delay and high reliability, such as URLLC data, without obtaining transmission permission. For example, the transmitter 100 can transmit this type of data, using a predetermined contention-type resource or a resource, such as eMBB, that has been allocated to the transmitter 100 by the receiver 200.

Figure 1:
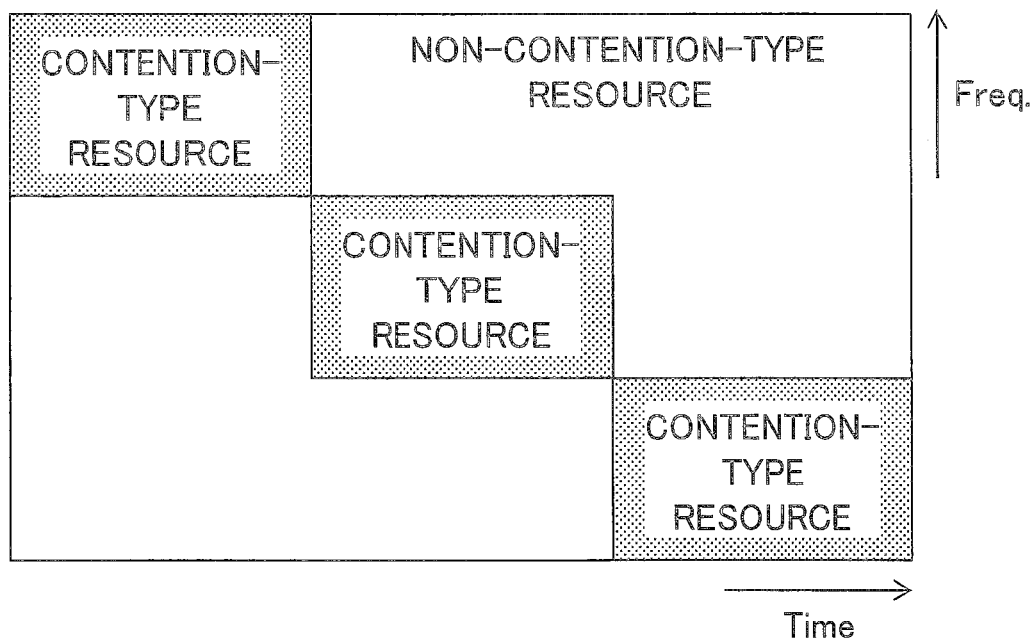
FIG. 1 is a diagram schematically illustrating a URLLC packet transmission method.

Here, the contention-type resource is a resource that is allowed to transmit only a contention-type packet that can be transmitted, without obtaining transmission permission, and may be configured by, for example, a resource array illustrated in FIG. 1. Typically, the contention-type resource is configured by the receiver 200, such as a base station, and is notified by broadcast information. The resource, such as eMBB, that does not interfere with other transmitters is a resource that is configured for a purpose, such as a mobile broad band service, that is different from the transmission of the above-mentioned type of data and is allocated to the transmitter 100 by the receiver 200 such as a base station. As described above, the contention-type resource can be used by transmitters other than the transmitter 100 and is likely to interfere with transmission by other transmitters. A resource, such as eMBB, is allocated by the receiver 200 so as not to interfere with transmission by other transmitters. Since the transmitter 100 uses the resource that does not interfere with transmission from other transmitters, it can transmit data with a higher reliability than the contention-type resource.

In the following embodiment, the transmission of URLLC data using one or both of the contention-type resource and the resource, such as eMBB, that has been allocated without interference is described. However, the invention is not limited to the two types of resources and other types of resources may be used. For example, instead of eMBB, resources for other services, such as mMTC, LTE, LTE-Advanced, and License Assisted Access (LAA), may be used as the allocated resources. In addition, the data that can be transmitted without obtaining transmission permission is not limited to URLLC and may be other types of data.

Figure 3:
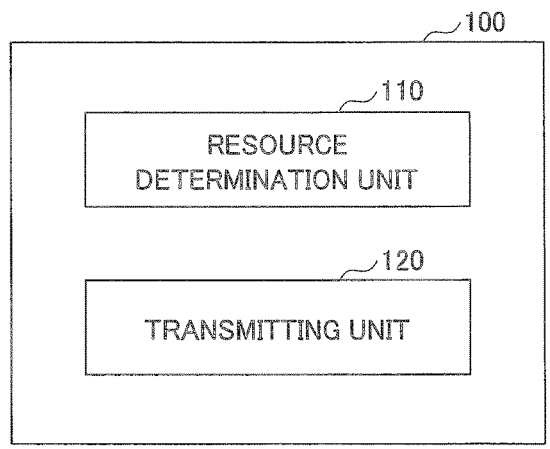
FIG. 3 is a block diagram illustrating the functional structure of a transmitter according to the embodiment of the invention.

Next, the transmitter according to the embodiment of the invention will be described with reference to FIG. 3. FIG. 3 is a block diagram illustrating the functional structure of the transmitter according to the embodiment of the invention.

As illustrated in FIG. 3, the transmitter 100 includes a resource determination unit 110 and a transmitting unit 120.

The resource determination unit 110 determines whether a first type of resource has been allocated in response to the generation of a transmission event for a predetermined type of information. Specifically, when URLLC data requiring low delay and high reliability needs to be transmitted, the resource determination unit 110 determines whether the resource, such as eMBB, that does not interfere with other transmitters has been allocated by the receiver 200 and whether the resource can be used to transmit data to the receiver 200.

Figure 4:
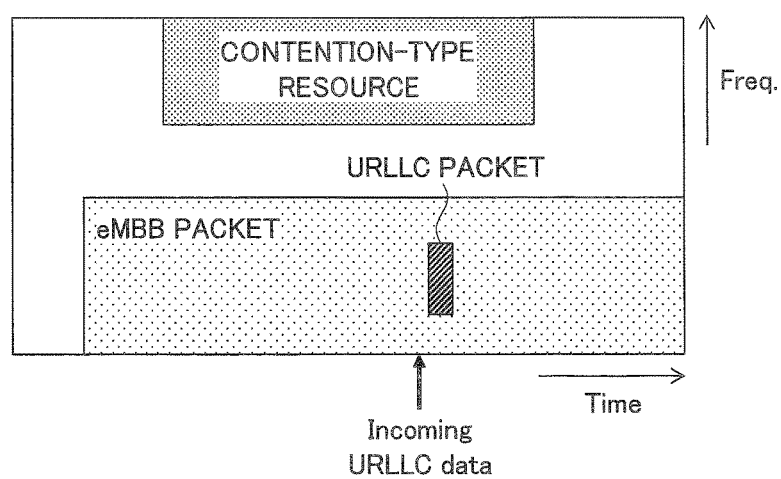
FIG. 4 is a diagram schematically illustrating a URLLC packet transmission resource according to the embodiment of the invention.

When the first type of resource has been allocated, the transmitting unit 120 transmits a predetermined type of information to the receiver 200, without obtaining transmission permission. Specifically, when a resource without interference has been allocated, as illustrated in FIG. 4, the transmitting unit 120 inserts a URLLC packet into the resource without interference and transmits URLLC data to the receiver 200, using the resource without interference, without obtaining transmission permission for the URLLC data.

As described above, it is possible to transmit the resource, such as eMBB, that does not interfere with transmission from other transmitters to the receiver 200 with a higher reliability than the contention-type resource. Therefore, when the transmitter 100 needs to transmit URLLC data, the resource determination unit 110 determines whether the resource without interference, such as eMBB, has been allocated to the transmitter 100. When the resource without interference has been allocated, the transmitting unit 120 transmits URLLC data, using the resource without interference that has been allocated preferentially over the contention-type resource. In this way, the transmitter 100 can transmit URLLC data with low delay and high reliability.

Here, when a URLLC packet is transmitted using eMBB, the transmitting unit 120 can puncture (not transmit), for example, some or all of eMBB transmission symbols, insert a URLLC packet into the punctured portion, and transmit URLLC data. In this case, preferably, important signals (for example, an L1/L2 control signal, broadcast information, a synchronizing signal, a data demodulating reference signal, delivery confirmation, a data demodulating reference signal, and a scheduling request) in eMBB are not punctured and the transmitting unit 120 punctures signals with a relative low priority, such as a data signal, a quality measuring reference signal, channel state information, and a quality measuring reference signal, and inserts URLLC into the punctured portion.

Alternatively, instead of puncturing the eMBB transmission symbols, the transmitting unit 120 may overwrite an information bit of eMBB with an information bit of URLLC. For example, the transmitting unit 120 may use some code segments of eMBB for the information bit of URLLC. In addition, the transmitting unit 120 may change the modulation order of eMBB to insert the information bit of URLLC. For example, the transmitting unit 120 may change an eMBB modulation method from QPSK (2 bits) to 16QAM (4 bits) and insert the information bit of URLLC into the remaining 2 bits. In addition, the transmitting unit 120 may share some of the bits with eMBB data and URLLC data, without changing the modulation order of eMBB. For example, in the case of QPSK, the transmitting unit 120 may use 1 bit on the front side in 2 bits for transmission for eMMB data and use 1 bit on the rear side for URLLC data.

The transmitting unit 120 determines various transmission parameters, such as the transmission power of URLLC inserted into the eMBB resource, a transmission bandwidth, a transmission position, and a modulation coding scheme (MCS), and transmits URLLC data to the receiver 200 according to the transmission parameters. Specifically, for the transmission power, since URLLC data is generated unexpectedly, it is difficult to perform transmission power control (TPC) for a long time. However, it is preferable to use the optimum TPC, in order to ensure high reliability. In addition, for the transmission bandwidth and the transmission position, when URLLC data is mapped to the outside of the resource allocated to eMBB, the URLLC data is likely to interfere with data from other transmitters. Therefore, it is preferable that the transmission bandwidth and the transmission position be limited to the band allocated to eMBB. In some cases, the transmission of data beyond the band of the eMBB resource is advantageous in terms of delay, which will be described below. For MCS, since URLLC data is generated unexpectedly, it is difficult to control a closed-loop type such as adaptive modulation and channel coding (AMC). It is necessary to achieve a required packet error rate (for example, the packet error rate=$10^{-5}$).

Figure 5:
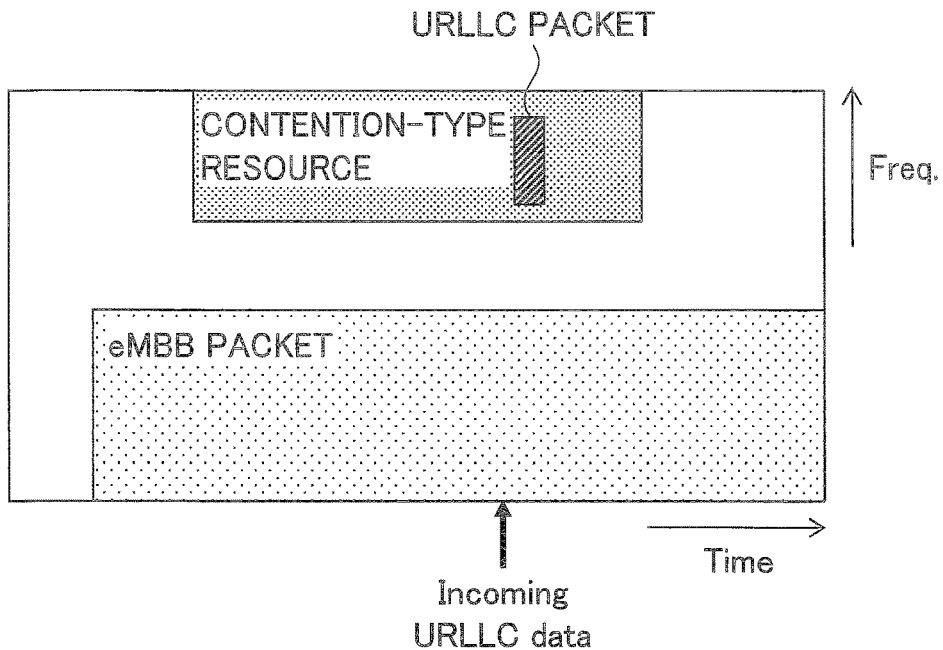
FIG. 5 is a diagram schematically illustrating a URLLC packet transmission resource according to another embodiment of the invention.

On the other hand, when the first type of resource has not been allocated or when the receiver 200 is expected not to detect a predetermined type of information from the first type of resource, the transmitting unit 120 may transmit a predetermined type of information to the receiver 200, using a second type of resource that is configured in order to transmit the predetermined type of information. That is, when the eMBB resource has not been allocated to the transmitter 100, the transmitting unit 120 may transmit URLLC data to the receiver 200, using the contention-type resource that is configured in order to transmit a contention-type packet, such as a URLLC packet, as illustrated in FIG. 5. When the eMBB resource has been allocated to the transmitter 100 and the receiver 200 is expected to have difficulty in detecting the URLLC packet inserted into the eMBB resource, for example, when a small amount of resources is allocated to eMBB and a URLLC coding rate is greater than a predetermined value (for example, 0.931), similarly, the transmitting unit 120 may transmit URLLC data to the receiver 200, using the contention-type resource. Alternatively, when the receiver 200 is expected to have difficulty in detecting an eMBB packet due to the insertion of a URLLC packet into the eMBB resource, for example, when the eMBB coding rate is greater than a predetermined value (for example, 0.931), similarly, the transmitting unit 120 may transmit URLLC data to the receiver 200, using the contention-type resource.

In an embodiment, the transmitting unit 120 may transmit a predetermined type of information to the receiver 200 together with additional information that is used by the receiver 200 to detect a predetermined type of information from the first type of resource. Specifically, the transmitting unit 120 may transmit a preamble or a cyclic redundancy check (CRC) code together with a URLLC packet such that the receiver 200 can easily detect the inserted URLLC packet from the eMBB resource. In this case, the preamble may be randomly selected from a series, which has been defined in advance, by the transmitting unit 120 or may be signaled by the receiver 200. The CRC may be masked by the same series as a terminal number (for example, C-RNTI) allocated to the transmitting unit 120 or another terminal number that has been signaled from the receiver 200 in advance may be used. The receiver 200 needs to perform blind detection for the received eMBB resource in order to detect the inserted URLLC packet. The use of the addition information makes it possible to easily detect the URLLC packet from the eMBB resource. In addition, the transmitting unit 120 may further insert a control channel including the control information of the URLLC packet (for example, MCS and an allocation resource) into the eMBB resource. In this case, the receiver 200 can rapidly detect and decode the URLLC packet on the basis of the inserted control information. Alternatively, URLLC may be inserted into the uplink control information of eMBB, and/or the control information (MCS and an allocation resource) of the URLLC packet may be added to the uplink control information and then transmitted.

Figure 6:
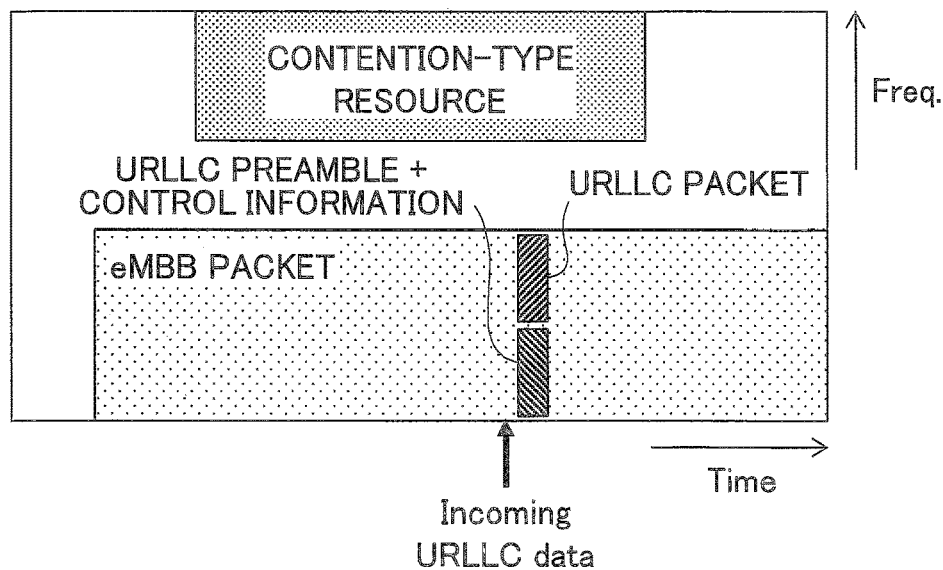
FIG. 6 is a diagram schematically illustrating the transmission resource of a URLLC packet by FDM in the embodiment of the invention.
Figure 7:
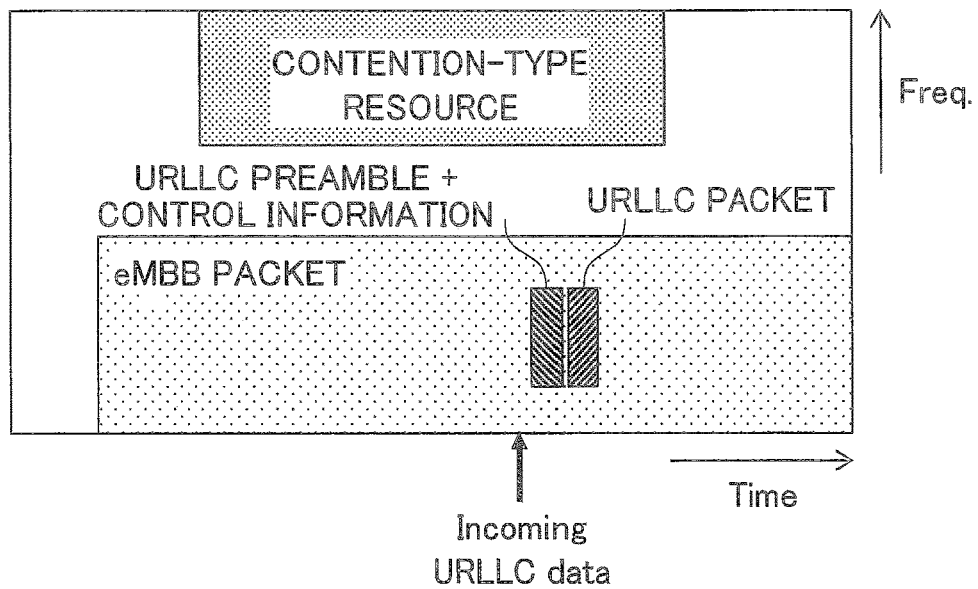
FIG. 7 is a diagram schematically illustrating the transmission resource of a URLLC packet by TDM in the embodiment of the invention.

In an embodiment, the transmitting unit 120 may insert the additional information into the eMBB resource using a frequency division multiplexing (FDM) method, a time division multiplexing (TDM) method, or a code division multiplexing (CDM) method. The transmitting unit 120 may use a non-orthogonal multiplexing method in order to save resources. For example, when a URLLC packet and the above-mentioned additional information are inserted by the FDM method, the transmitting unit 120 may insert the URLLC packet and the additional information into the eMBB resource, using the resource arrangement illustrated in FIG. 6. When the URLLC packet and the additional information are inserted by the TDM method, the transmitting unit 120 may insert the URLLC packet and the additional information into the eMBB resource, using the resource arrangement illustrated in FIG. 7. It is preferable that additional information for detection be arranged in front of the URLLC packet.

In an embodiment, the transmitting unit 120 may implicitly notify the control information of the URLLC packet according to the type of preamble series. For example, a specific MCS may be allocated to each preamble series in advance and the transmitting unit 120 may insert a preamble series corresponding to MCS, which has been applied to the inserted URLLC packet, as the additional information into the eMBB resource. In this case, the transmitting unit 120 can notify the receiver 200 of the control information of the URLLC packet, without puncturing a portion of the eMBB data, in order to insert the control information.

Figure 8:
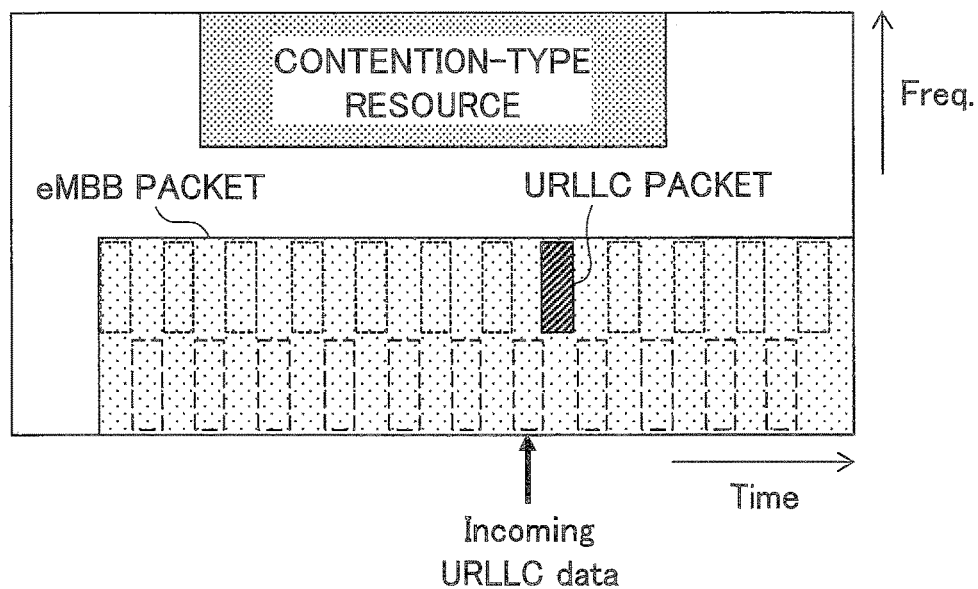
FIG. 8 is a diagram schematically illustrating the candidate resources of the URLLC packet which are densely arranged in a time direction in the embodiment of the invention.
Figure 9:
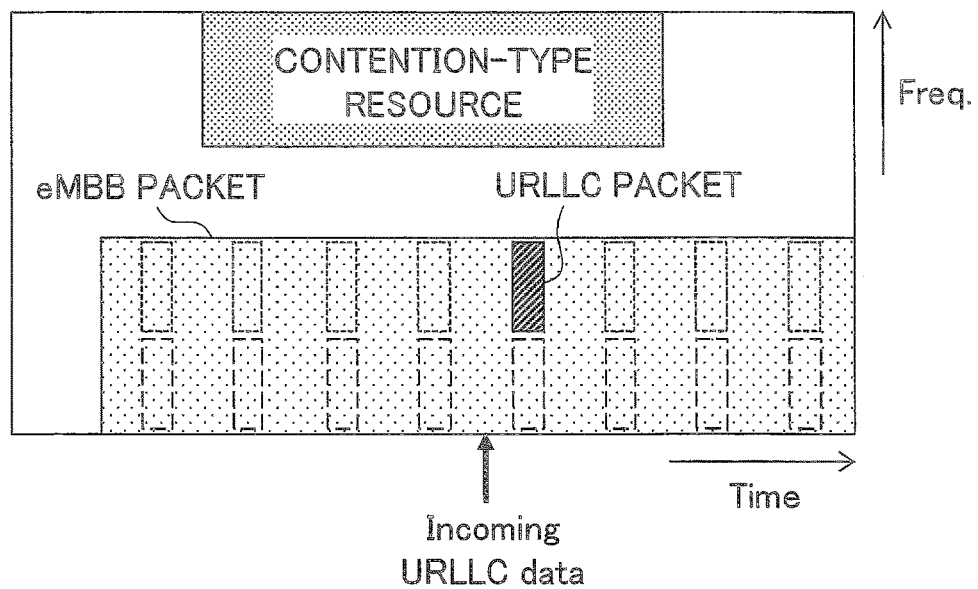
FIG. 9 is a diagram schematically illustrating the candidate resources of the URLLC packet which are densely arranged in a frequency direction in the embodiment of the invention.

In an embodiment, the transmitting unit 120 may transmit a predetermined type of information to the receiver 200, using candidate resources configured in the first type of resource. As described above, the receiver 200 performs blind detection for the received eMBB resource to detect the inserted URLLC packet. In order to reduce the complexity of the blind detection, the receiver 200 may define a plurality of candidate resources, into which a URLLC packet can be inserted, in the eMBB resource in advance and the transmitting unit 120 may transmit the URLLC packet, using any one of the candidate resources. For example, as illustrated in FIG. 8, the receiver 200 may densely arrange the candidate resources in the time direction in order to reduce a delay. According to this arrangement, when URLLC data needs to be transmitted, the transmitting unit 120 can transmit a URLLC packet to the receiver 200, using the candidate resources in the eMBB resource, without a large delay. The receiver 200 may sparsely arrange the candidate resources in the time direction in the allowable range of delay, as illustrated in FIG. 9, in order to reduce the complexity of the blind detection. In addition, the candidate resources may be fixedly defined in advance or may be notified or broadcasted to the transmitter 100 by the receiver 200. In order to reduce signaling overhead related to the notification or broadcasting, some candidate patterns related to the arrangement of the candidate resources may be defined and the receiver 200 may notify or broadcast an index corresponding to a selected candidate pattern to the transmitter 100.

Figure 10:
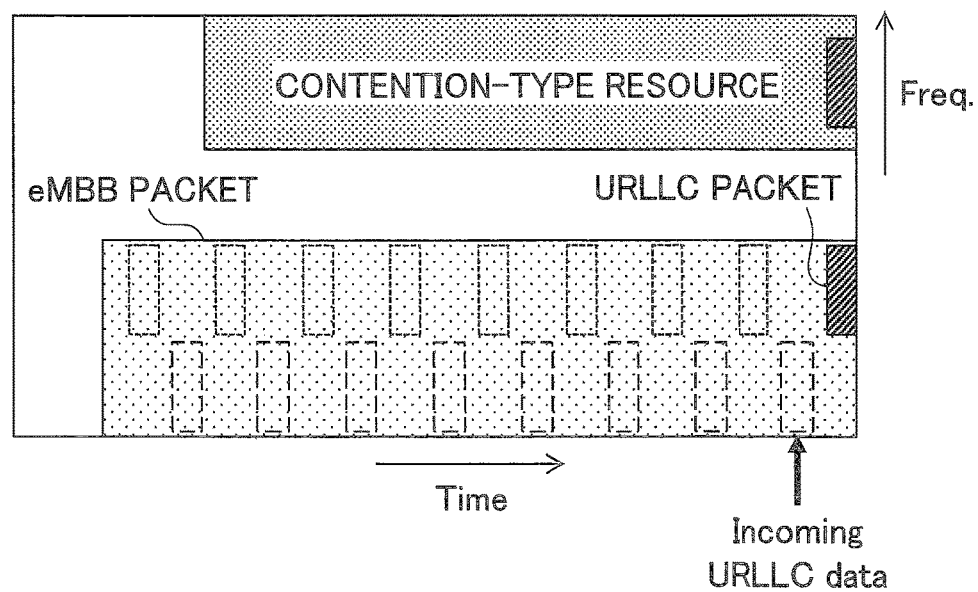
FIG. 10 is a diagram schematically illustrating the candidate resources of a URLLC packet according to another embodiment of the invention.

In an embodiment, the transmitting unit 120 may transmit a predetermined type of information to the receiver 200, using both the first type of resource and the second type of resource, according to the time when a transmission event is generated. Specifically, when URLLC data needs to be transmitted at the end of the allocated eMBB resource, there is the possibility that the transmitting unit 120 will not complete the transmission of URLLC data, using only the eMBB resource. In this case, as illustrated in FIG. 10, the transmitting unit 120 may transmit a URLLC packet, using both the eMBB resource and the contention-type resource. Alternatively, after transmitting a URLLC packet using the last eMMB resource, the transmitting unit 120 may transmit the remaining URLLC packets using the contention-type resource.

Figure 11:
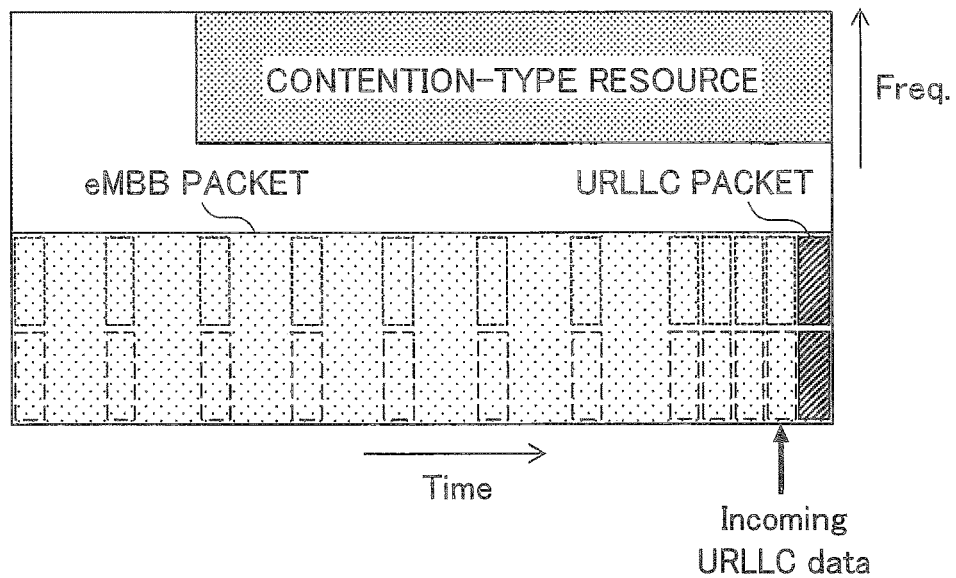
FIG. 11 is a diagram schematically illustrating the candidate resources of a URLLC packet according to still another embodiment of the invention.

In order to prevent the exhaustion of the candidate resources for transmitting URLLC data at the end of the eMBB resource, the receiver 200 may densely allocate the candidate resources to an end portion of the eMBB resource in the time direction, as illustrated in FIG. 11. In this case, even when URLLC data needs to be transmitted at the end of the allocated eMBB resource, the transmitting unit 120 can complete the transmission of a URLLC packet, using the eMBB resource.

Exceptionally, the transmitting unit 120 may transmit a URLLC packet even in a region other than the allocated eMBB resource in the end portion of the eMBB resource, in addition to the eMBB resource. For example, the transmitting unit 120 may transmit a URLLC packet in a region beyond the transmission band of the allocated eMBB resource in the end portion of the eMBB resource. Alternatively, the transmitting unit 120 may transmit a URLLC packet, continuously using the transmission band of the eMBB resource after the eMBB resource ends. The exceptional transmission may be performed according to, for example, signaling from the receiver 200 which allows the exceptional transmission.

Figure 12:
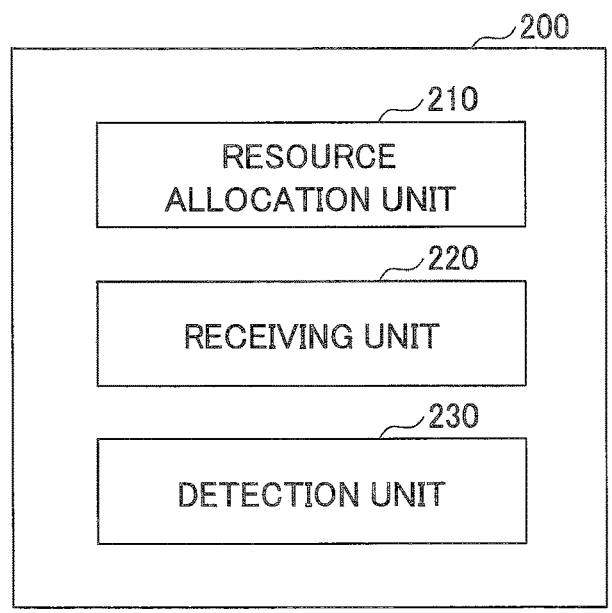
FIG. 12 is a block diagram illustrating the functional structure of a receiver according to the embodiment of the invention.

Next, a receiver according to an embodiment of the invention will be described with reference to FIG. 12. FIG. 12 is a block diagram illustrating the functional structure of the received according to an embodiment of the invention.

As illustrated in FIG. 12, the receiver 200 includes a resource allocation unit 210, a receiving unit 220, and a detection unit 230.

The resource allocation unit 210 allocates the first type of resource to the transmitter 100. Specifically, the resource allocation unit 210 allocates various types of resources including the eMBB resource to the transmitter 100. As described above, when the transmission of URLLC data is needed, the transmitter 100 transmits the URLLC data, using the allocated eMBB resource. In addition, the resource allocation unit 210 configures the contention-type resource that enables the transmitter 100 to transmit data, without obtaining transmission permission, and notifies or broadcasts the contention-type resource to the transmitter 100.

The receiving unit 220 receives the first type of resource from the transmitter 100. Specifically, the receiving unit 220 receives the eMBB resource having the URLLC packet inserted thereinto.

The detection unit 230 detects a predetermined type of information, which has been transmitted without obtaining transmission permission, from the first type of resource received from the transmitter 100. Specifically, the detection unit 230 performs blind detection for the eMBB resource received from the transmitter 100 to detect the URLLC packet inserted into the eMBB resource.

In an embodiment, the resource allocation unit 210 may configure candidate resources for transmitting a predetermined type of information in the first type of resource. Specifically, the resource allocation unit 210 configures, in the eMBB resource, a plurality of candidate resources for transmitting the URLLC data which is transmitted from the transmitter 100 without obtaining transmission permission, as illustrated in FIGS. 8 and 9. As described above, the detection unit 230 performs blind detection for the received eMBB resource to detect the URLLC packet. In order to reduce the complexity of the blind detection, the resource allocation unit 210 may define a plurality of candidate resources, into which a URLLC packet can be inserted, in the eMBB resource in advance and direct the transmitter 100 to transmit the URLLC packet, using any one of the candidate resources. For example, the resource allocation unit 210 may densely arrange the candidate resources in the time direction in order to reduce a delay, as illustrated in FIG. 8. According to this arrangement, when URLLC data needs to be transmitted, the transmitter 100 can transmit a URLLC packet to the receiver 200, using the candidate resources in the eMBB resource, without a large delay. The resource allocation unit 210 may sparsely arrange the candidate resources in the time direction in the allowable range of delay, as illustrated in FIG. 9, in order to reduce the complexity of the blind detection. In addition, the candidate resources may be fixedly defined in advance or may be notified or broadcasted to the transmitter 100. In order to reduce signaling overhead related to the notification or broadcasting, some candidate patterns related to the arrangement of the candidate resources may be defined and the resource allocation unit 210 may notify or broadcast an index corresponding to a selected candidate pattern to the transmitter 100.

In an embodiment, the resource allocation unit 210 may densely allocate the candidate resources to an end portion of the first type of resource in the time direction. Specifically, as illustrated in FIG. 11, the resource allocation unit 210 may allocate a relatively large number of candidate resources to an end portion of the eMMB resource. In this case, even when URLLC data needs to be transmitted at the end of the eMBB resource, the transmitter 100 can complete the transmission of a URLLC packet, using the eMBB resource.

Exceptionally, the transmitter 100 may transmit a URLLC packet even in a region other than the allocated eMBB resource in the end portion of the eMBB resource, in addition to the eMBB resource. For example, the transmitter 100 may transmit a URLLC packet in a region beyond the transmission band of the allocated eMBB resource in the end portion of the eMBB resource. Alternatively, the transmitter 100 may transmit a URLLC packet, continuously using the transmission band of the eMBB resource after the eMBB resource ends. The exceptional transmission may be performed according to, for example, signaling from the resource allocation unit 210 which allows the exceptional transmission.

In an embodiment, the detection unit 230 may detect a predetermined type of information on the basis of additional information for detecting a predetermined type of information from the first type of resource. Specifically, the transmitter 100 can transmit a preamble or a CRC code together with a URLLC packet such that the detection unit 230 can easily detect the URLLC packet inserted into the eMBB resource. The detection unit 230 needs to perform blind detection for the eMBB resource in order to detect the inserted URLLC packet. The use of the additional information makes it possible to easily detect the inserted URLLC packet. In addition, the transmitter 100 can further insert a control channel including the control information (for example, MCS and an allocation resource) of the URLLC packet into the eMBB resource. In this case, the detection unit 230 can rapidly detect and decode the URLLC packet on the basis of the inserted control information.

The block diagrams used to describe the above-mentioned embodiment illustrate functional unit blocks. The functional blocks (components) are implemented by an arbitrary combination of hardware and/or software. In addition, a means for implementing each functional block is not particularly limited. That is, each functional block may be implemented by one device that is physical and/or logically coupled or by a plurality of devices that are physically and/or logically separated from each other and are connected directly and/or indirectly (for example, in a wired manner and/or wirelessly).

Figure 13:
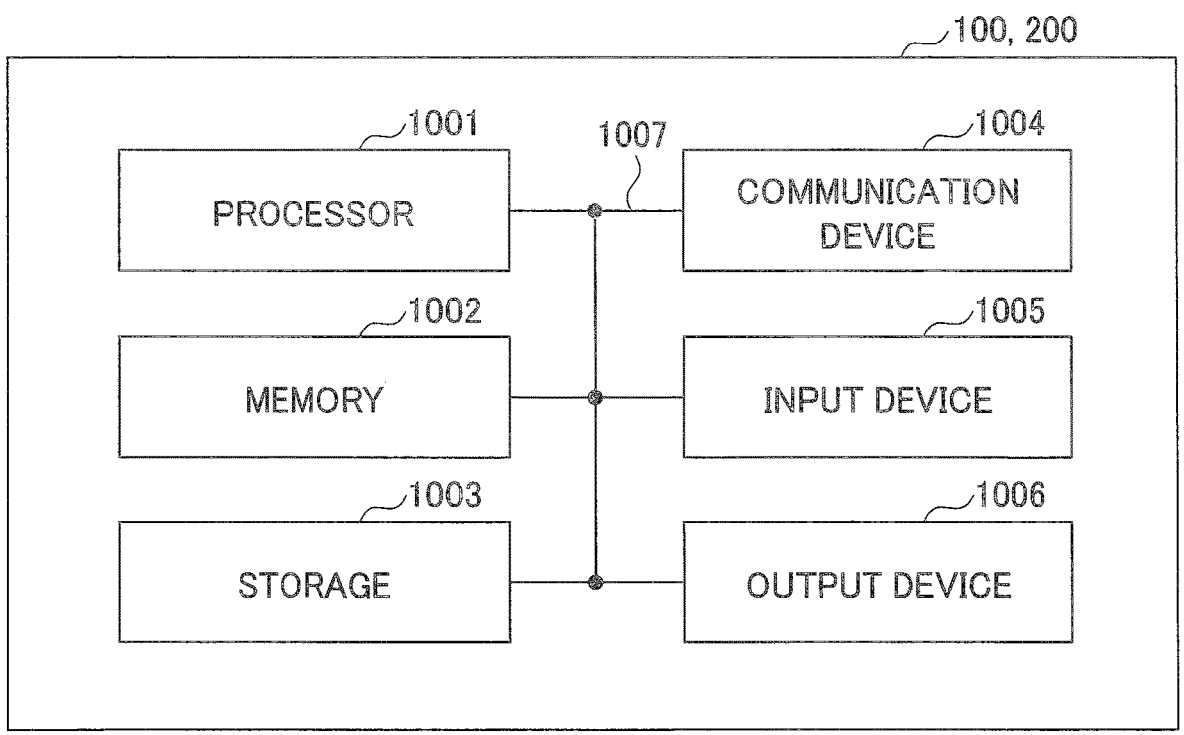
FIG. 13 is a block diagram illustrating the hardware configuration of the transmitter and the receiver according to the embodiment of the invention.

For example, the transmitter and the receiver according to the embodiment of the invention may function as a computer that processes the wireless communication method according to the invention. FIG. 13 is a block diagram illustrating the hardware configuration of the transmitter and the receiver according to the embodiment of the invention. Each of the transmitter 100 and the receiver 200 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, and a unit. The hardware configuration of the transmitter 100 and the receiver 200 may include one or a plurality of devices illustrated in the drawings or may not include some of the devices.

Each function of the transmitter 100 and the receiver 200 may be implemented by the following process: predetermined software (program) is read onto hardware, such as the processor 1001 or the memory 1002 and the processor 1001 performs an operation to control the communication of the communication device 1004 or the reading and/or writing data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, each of the included elements may be implemented by the processor 1001.

The processor 1001 reads a program (program code), a software module, or data from the storage 1003 and/or the communication device 1004 to the memory 1002 and performs various types of processes according to the program, the software module, or the data. A program that causes a computer to perform at least some of the operations described in the embodiment is used as the program. For example, the processes performed by each component of the transmitter 100 and the receiver 200 may be implemented by a control program that is stored in the memory 1002 and is executed by the processor 1001. Other functional blocks may be implemented by the above-mentioned method. In this embodiment, the above-mentioned various processes are performed by one processor 1001. However, the processes may be simultaneously or sequentially performed by two or more processors 1001. The processor 1001 may be mounted with one or more chips. The program may be transmitted from the network through an electric communication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, a program (program code) and a software module that can be executed to perform the wireless communication method according to the embodiment of the invention.

The storage 1003 is a computer-readable recording medium and may be, for example, at least one of an optical disk, such as a compact disc ROM (CD-ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, and a magnetic strip. The storage 1003 may be referred to as an auxiliary storage device. The above-mentioned storage medium may be, for example, a database, a server, and other proper media including the memory 1002 and/or the storage 1003.

The communication device 1004 is hardware (transmitting and receiving device) for communicating with the computer through a wired and/or wireless network and is also referred to as, for example, a network device, a network controller, a network card, or a communication module. For example, the transmitting unit 120 and the receiving unit 220 may be implemented by the communication device 1004.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs an output process to the outside. The input device 1005 and the output device 1006 may be integrated with each other (for example, a touch panel).

All of the devices, such as the processor 1001 and the memory 1002, are connected to each other by a bus 1007 for information communication. The bus 1007 may be a single bus or the devices may be connected to each other by different buses.

The transmitter 100 and the receiver 200 may include hardware, such as a microprocessor, a digital signal processor (DSP), an application specific integrated circuit (ASIC), a programmable logic device (PLD), and a field programmable gate array (FPGA), or some or all of the functional blocks may be implemented by the hardware. For example, the processor 1001 may be mounted with at least one of these hardware components.

The notification of information is not limited to the aspect/embodiment described in the specification and may be performed by other methods. For example, the notification of information may be performed by physical layer signaling (for example, downlink control information (DCI) and uplink control information (UCI)), higher layer signaling (for example, radio resource control (RRC) signaling, medium access control (MAC) signaling, and broadcast information (a master information block (MIB) and a system information block (SIB))), other signals, or combinations thereof. The RRC signaling may be also referred to as an RRC message and may be, for example, an RRC connection setup message or an RRC connection reconfiguration message.

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other proper systems and/or next-generation systems that are extended on the basis of these systems.

In each aspect/embodiment described in the specification, for example, the order of the processes in the procedure, the sequence, and the flowchart may be changed as long as there is no contraction between the processes. For example, for the method described in the specification, elements of various steps are presented in the exemplified order and are not limited to the presented specific order.

In the specification, in some cases, the specific operation performed by the receiver 200 (base station) is performed by an upper node of the receiver. In a network having one or a plurality of network nodes including the base station, it is apparent that various operations performed for communication with a terminal can be performed by the base station and/or a network node (for example, MME or S-GW is considered and the network node is not limited thereto) other than the base station. In the above-mentioned example, one network node is provided other than the base station. However, a plurality of other network nodes (for example, MME and S-GW) may be combined with each other.

For example, information can be output from a higher layer (or a lower layer) to a lower layer (or a higher layer). Information may be input and output through a plurality of network nodes.

For example, the input and output information may be stored in a specific place (for example, a memory) or may be managed by a management table. For example, the input and output information can be overwritten, updated, or additionally written. For example, the output information may be deleted. For example, the input information may be transmitted to other devices.

Determination may be performed by a one-bit value (0 or 1), a Boolean value (true or false), or the comparison between values (for example, comparison with a predetermined value).

The aspects/embodiments described in the specification may be independently used, may be combined with each other, or may be changed in association with execution. The notification of predetermined information (for example, "notification that the predetermined information is X") is not limited to explicit notification and may be implicit notification (for example, the predetermined information is not notified).

The invention has been described in detail above. It will be apparent to those skilled in the art that the invention is not limited to the embodiment described in the specification. Various modifications and changes of the invention can be made without departing from the scope and spirit of the invention which are defined by the claims. Therefore, the specification is illustrative and does not limit the invention.

Software can be construed broadly to mean, for example, a command, a command set, a code, a code segment, a program code, a program, a sub-program, a software module, an application, a software application, a software package, a routine, a sub-routine, an object, an executable file, an execution thread, a procedure, and a function, regardless of whether it is referred to as software, firmware, middleware, a microcode, a hardware description language, or other names.

For example, software and commands may be transmitted and received through a transmission medium. For example, when software is transmitted from a website, a server, or other remote sources by a wired technique, such as a coaxial cable, an optical fiber cable, a twisted pair cable, and a digital subscriber line (DSL), and/or a radio technique, such as infrared rays, radio waves, and microwaves, the wired technique and/or the radio technique are included in the definition of the transmission medium.

For example, the information and the signals described in the specification may be represented by any of various different techniques. For example, data, a command, an instruction, information, a signal, a bit, a symbol, and a chip that can be mentioned in the entire description may be represented by a voltage, a current, electromagnetic waves, a magnetic field or magnetic particles, an optical field or a photon, or arbitrary combinations thereof.

The terms described in the specification and/or the terms required for the understanding of the specification may be substituted with the terms with the same or similar meaning. For example, a channel and/or a symbol may be a signal. In addition, a signal may be a message. A component carrier (CC) may be referred to as a carrier frequency or a cell.

The terms "system" and "network" used in the specification are interchangeably used.

For example, the information and the parameters described in the specification may be represented by absolute values or the relative values of predetermined values. For example, a radio resource may be indicated by an index.

The names of the above-mentioned parameters are not restrictive at all. In some cases, for example, numerical expressions using these parameters are different from the expressions that are explicitly disclosed in the specification. All of various channels (for example, PUCCH and PDCCH) and information elements (for example, TPC) can be identified by proper names. Therefore, various names allocated to the various channels and information elements are not restrictive at all.

The base station can accommodate one or a plurality of (for example, three) cells (also referred to as sectors). When the base station accommodates a plurality of cells, the entire coverage area of the base station may be divided into a plurality of small areas and a communication service may be provided to each of the small areas by a base station sub-system (for example, a small indoor remote radio head (RRH)). The term "cell" or "sector" indicates a portion or the entire coverage area of the base station and/or the base station sub-system that provides the communication service in the coverage. The terms "base station", "eNB", "cell", and "sector" can be interchangeably used in the specification. In some cases, the base station is referred to as a fixed station, NodeB, eNodeB (eNB), an access point, a femtocell, or a small cell.

In some cases, a mobile station is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other proper terms according to operators.

In some cases, the terms "determining" and "determining" used in the specification include various operations. The terms "determining" and "deciding" can include, for example, "determination" and "decision" for calculating, computing, processing, deriving, investigating, looking-up (for example, looking-up in a table, a database, or other data structures), and ascertaining operations. In addition, the terms "determining" and "deciding" can include "determination" and "decision" for receiving (for example, receiving information), transmitting (for example, transmitting information), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. In the specification, it can be considered that two elements are "connected" or "coupled" to each other by using one or more electric wires, a cable and/or a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

The term "on the basis of" used in the specification does not mean "on the basis of only" unless otherwise stated. In other words, the term "on the basis of" means both "on the basis of only" and "on the basis of at least".

Any reference to elements with the names "first" and "second" used in the specification does not generally limit the number of elements or the order of the elements. These names can be used as a convenient method for distinguishing two or more elements in the specification. Therefore, a reference to the first and second elements does not mean that only two elements can be used or that the first element needs to precede the second element in some form.

The term "means" in the structure of each of the above-mentioned devices may be substituted with, for example, a "unit", a "circuit", or a "device".

The terms "including" and "comprising" and the modifications thereof are intended to be inclusive, similarly to the term "having", as long as they are used in the specification or the claims. In addition, the term "or" used in the specification or the claims does not mean exclusive OR.

A radio frame may include one or a plurality of frames in the time domain. One frame or each of a plurality of frames in the time domain may be referred to as a subframe. The subframe may include one or a plurality of slots in the time domain. The slot may include one or a plurality of symbols (for example, OFDM symbols or SC-FDMA symbols) in the time domain. Each of the radio frame, the subframe, the slot, and the symbol indicates a time unit when a signal is transmitted. The radio frame, the subframe, the slot, and the symbol may have different names. For example, the LTE system performs scheduling in which a base station allocates radio resources (for example, a frequency bandwidth or transmission power that can be used in each mobile station) to each mobile station. The minimum time unit of the scheduling may be referred to as a transmission time interval (TTI). For example, one subframe may be referred to as TTI, a plurality of continuous subframes may be referred to as TTI, or one slot may be referred to as TTI. A resource block (RB) is the unit of resource allocation in the time domain and the frequency domain. In the frequency domain, the resource block may include one or a plurality of continuous subcarriers. In the time domain of the resource block, the resource block may include one or a plurality of symbols and may be the length of one slot, one subframe, or one TTI. One TTI or one subframe may include one or a plurality of resource blocks. The structure of the radio frame is just an example and the number of subframes in the radio frame, the number of slots in the subframe, the number of symbols and resource blocks in the slot, and the number of subcarriers in the resource block can be changed in various ways.

The embodiments of the invention have been described above. The invention is not limited to the above-described specific embodiments and various modifications and changes of the invention can be made, without departing from the scope and spirit of the invention described in the claims.

The present application is based on and claims priority to Japanese patent application No. 2016-096522 filed on May 12, 2016, the entire contents of which are hereby incorporated by reference.

EXPLANATIONS OF LETTERS OR NUMERALS

10 WIRELESS COMMUNICATION SYSTEM
100 TRANSMITTER
110 RESOURCE DETERMINATION UNIT
120 TRANSMITTING UNIT
200 RECEIVER
210 RESOURCE ALLOCATION UNIT
220 RECEIVING UNIT
230 DETECTION UNIT

The invention claimed is:

1. A terminal comprising:
a processor that determines whether a first type of resource has been allocated in response to generation of a transmission event for a predetermined type of information; and
a transmitter that transmits the predetermined type of information to a receiver, using the first type of resource, without obtaining transmission permission, when the first type of resource has been allocated,
wherein the transmitter transmits the predetermined type of information to the receiver, using candidate resources configured in the first type of resource, the candidate resources being fixedly defined in advance or being notified by the receiver, and
wherein the candidate resources are densely allocated to an end portion of the first type of resource in a time direction.

2. The terminal according to claim 1,
wherein, when the first type of resource has not been allocated or when the receiver is expected not to detect the predetermined type of information from the first type of resource, the transmitter transmits the predetermined type of information to the receiver, using a second type of resource that is configured in order to transmit the predetermined type of information.

3. The terminal according to claim 2,
wherein the transmitter transmits the predetermined type of information to the receiver together with additional information which is used by the receiver to detect the predetermined type of information from the first type of resource.

4. The terminal according to claim 2,
wherein the transmitter transmits the predetermined type of information to the receiver, using both the first type of resource and the second type of resource configured in order to transmit the predetermined type of information, according to a time when the transmission event is generated.

5. The terminal according to claim 1,
wherein the transmitter transmits the predetermined type of information to the receiver together with additional information which is used by the receiver to detect the predetermined type of information from the first type of resource.

6. The terminal according to claim 5,
wherein the transmitter transmits the predetermined type of information to the receiver, using both the first type of resource and the second type of resource configured in order to transmit the predetermined type of information, according to a time when the transmission event is generated.

7. The terminal according to claim 1,
wherein the transmitter transmits the predetermined type of information to the receiver, using both the first type of resource and the second type of resource configured in order to transmit the predetermined type of information, according to a time when the transmission event is generated.

8. A base station comprising:
processor that allocates a first type of resource to a transmitter; and
a receiver that receives the first type of resource from the transmitter,
wherein the processor detects a predetermined type of information from the received first type of resource,
wherein the processor performs blind detection,
wherein the processor configures candidate resources for transmitting the predetermined type of information in the first type of resource, the candidate resources being fixedly defined in advance or being notified by the receiver, and
wherein the processor densely allocates the candidate resources to an end portion of the first type of resource in a time direction.

9. The base station according to claim 8,
wherein the processor detects the predetermined type of information on the basis of additional information for detecting the predetermined type of information from the first type of resource, the additional information being received from the transmitter.

* * * * *